United States Patent [19]
Shreck

[11] Patent Number: 6,042,138
[45] Date of Patent: Mar. 28, 2000

[54] MOTORCYCLE TRAILER APPARATUS

[76] Inventor: Richard D. Shreck, 5394 Lake Village Dr., Memphis, Tenn. 38125

[21] Appl. No.: 09/089,972

[22] Filed: Jun. 3, 1998

[51] Int. Cl.⁷ ...................................................... B60D 7/00
[52] U.S. Cl. .............................................. 280/492; 280/78
[58] Field of Search ............................. 280/78, 204, 492, 280/493, 494, 515

[56] References Cited

U.S. PATENT DOCUMENTS

| | | | |
|---|---|---|---|
| 3,937,489 | 2/1976 | Hawes et al. | 280/204 |
| 4,511,155 | 4/1985 | Galloway | 280/204 |
| 4,548,423 | 10/1985 | Craven | 280/204 |
| 4,756,541 | 7/1988 | Albitre | 280/204 |
| 5,011,170 | 4/1991 | Forbes et al. | 280/204 |
| 5,098,113 | 3/1992 | Albitre | 280/204 |
| 5,151,005 | 9/1992 | Spigner | 280/462 |
| 5,186,483 | 2/1993 | Sheppard | 280/492 |
| 5,470,088 | 11/1995 | Adams | 280/492 |

FOREIGN PATENT DOCUMENTS

| | | | |
|---|---|---|---|
| 1054496 | 2/1954 | France | 280/204 |
| 2454951 | 12/1980 | France | B62K 27/12 |
| 2608547 | 6/1988 | France | B62D 63/06 |
| 868120 | 2/1953 | Germany | B62H 12/20 |
| 502316 | 11/1954 | Italy | 280/204 |
| 58-161671 | 9/1983 | Japan | B62D 53/04 |
| 422768 | 1/1935 | United Kingdom | 280/204 |

*Primary Examiner*—Kevin Hurley
*Attorney, Agent, or Firm*—Garvey, Smith, Nehrbass & Doody, L.L.C.

[57] ABSTRACT

A motorcycle trailer apparatus includes an elongated frame having first and second end portions, the first end portion carrying a detachable hitch for attaching the frame to the rear of a motorcycle. An arm assembly is pivotally attached to the frame at the second end portion. A single wheel is carried by the arm assembly. A shock absorber extends between the frame and the arm assembly at an inclined portion of the arm assembly. The shock absorber is inclined with its rear end portion being higher than the front end portion to provide an improved geometry for the combination of frame, arm assembly, shock absorber and wheel.

19 Claims, 4 Drawing Sheets

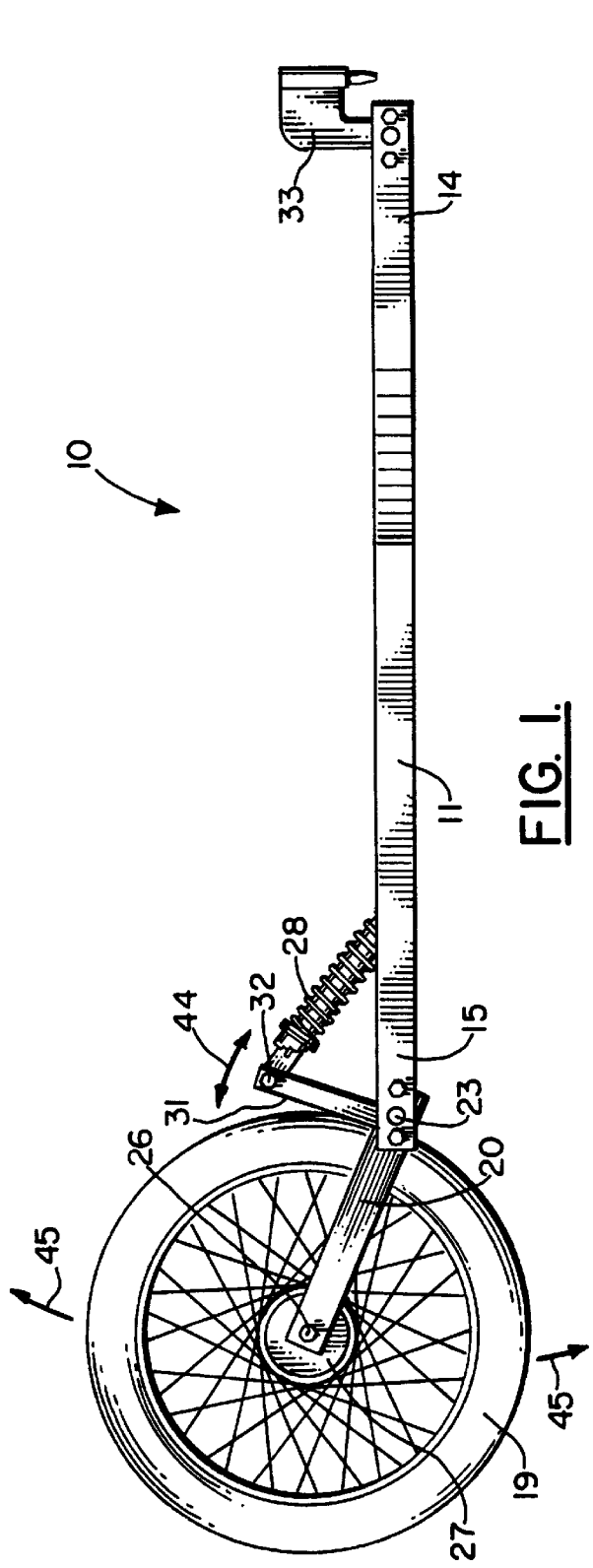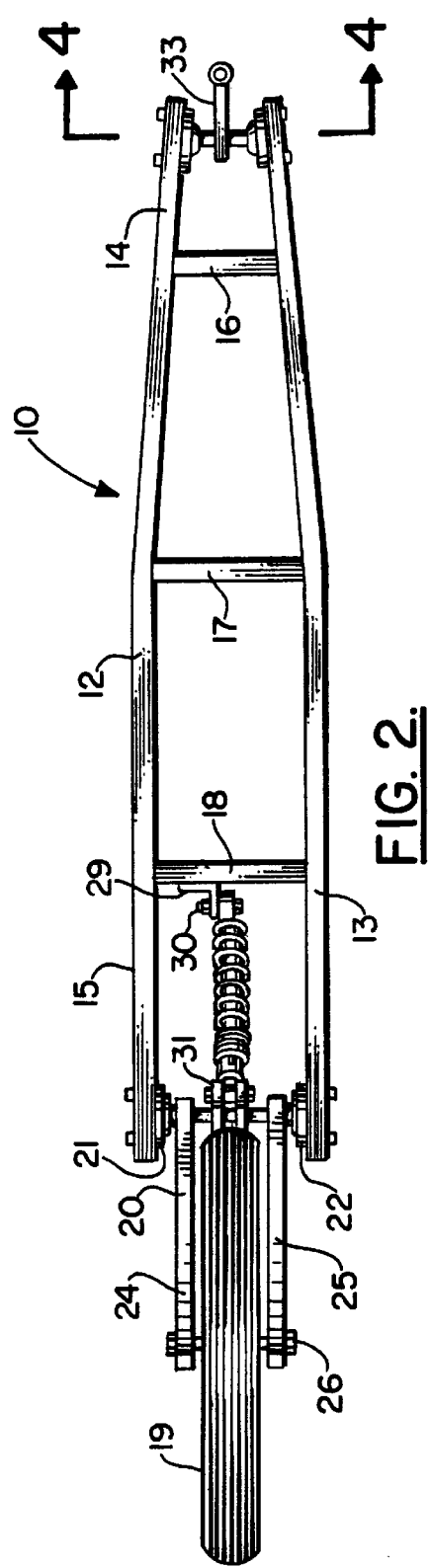

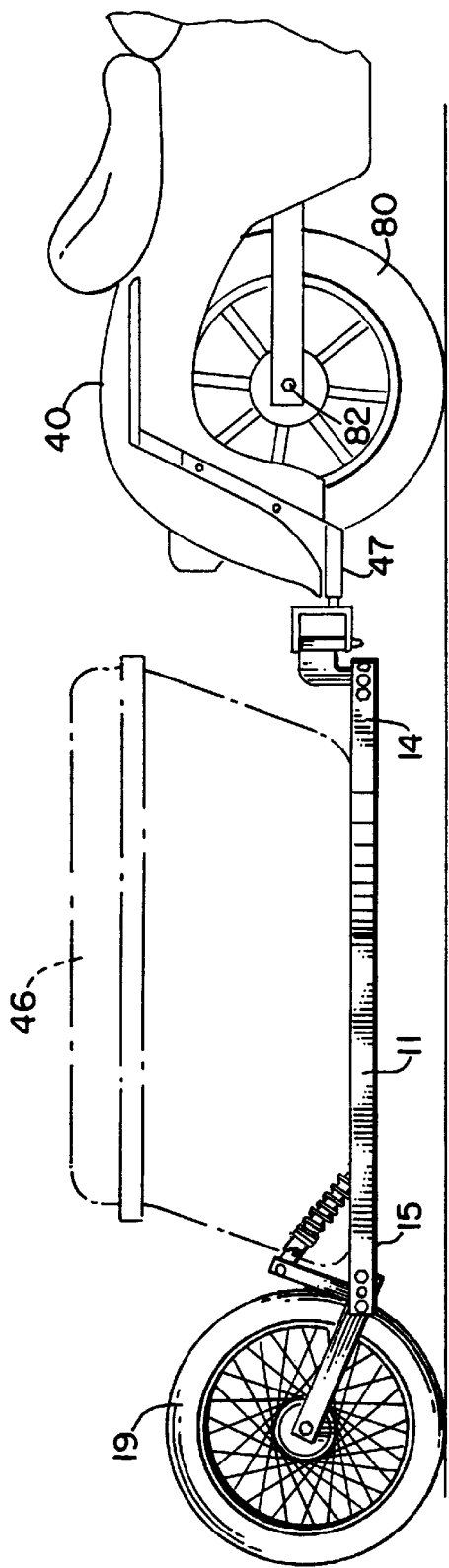
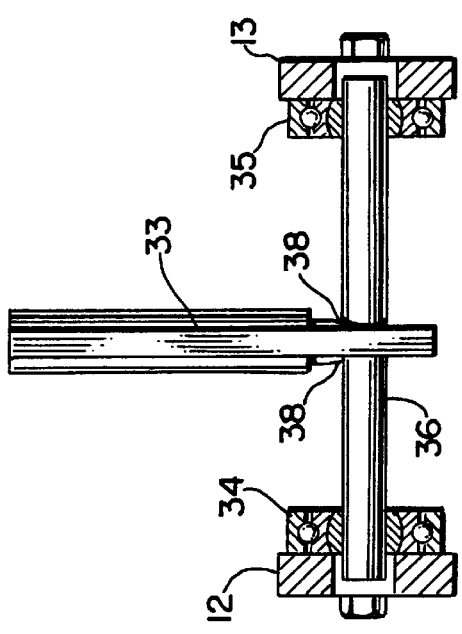
FIG. 3.
FIG. 4.

MOTORCYCLE TRAILER APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to trailers that can be towed by two-wheeled vehicles such as motorcycles, bicycles and the like, wherein the trailer has a single rear mounted road wheel. More particularly, the present invention relates to an improved motorcycle trailer apparatus that includes an improved configuration that includes a rear wheel, shock absorber, and swing arm assembly mounted on a frame with unique frame geometry. The present invention further relates to an improved motorcycle trailer and hitch apparatus that provides a heretofore unknown stability through locating the hitching mechanism and trailer frame below the axis of rotation of either or both of the trailer and motorcycle rear wheels.

2. General Background of the Invention

There are a number of large motorcycles available in today's market that have powerful engines that propel them easily at interstate highway speeds of 70 mph. These road motorcycles are typically provided with engines that range from 250 cc to over 1000 cc in displacement. These engines are also powerfil enough to pull a substantial load in the form of a trailer.

There are a number of prior art trailers that have been designed for towing behind a motorcycle. The Hawes et al. U.S. Pat. No. 3,937,489 discloses a trailer for a motorcycle that includes a hitch formed of two parallel flat plates attached to the trailer by a hinge having a transversely disposed horizontal axis. Another flat plate is sandwiched between the two parallel plates. The plates are fastened together by a pin inserted through holes in the plates to form a hinge having a vertical axis. Tubular members are mounted to the motorcycle and receive extensions adjustably mounted to the inner flat plate to thereby attach the trailer to the motorcycle. The trailer also has a resilient suspension system for the trailer road wheel which is adjustable to compensate for various loads carried on the trailer and is formed in a manner such that wind acting on the top of the trailer acts to urge the trailer downwardly to thus stabilize the trailer when in use.

In the Galloway U.S. Pat. No. 4,511,155 there is provided a one-wheel trailer for a two-wheeled vehicle such as a motorcycle. The trailer includes a first and a second arm, each arm having a first and second end. The first end of each arm is connected preferably to the site corresponding to a passenger footpeg of the two wheeled vehicle or the like. A rigid frame is secured adjacent the second end of each arm. A container is secured to the bulkhead and a spring biased suspension arm is pivotally connected to the bulkhead. A castor arm is mounted adjacent the distal end of the suspension arm enabling swivelling of the castor arm relative tot he suspension arm. A wheel is rotatably mounted relative to the castor arm permitting the wheel to support the container.

A trailer that is designed for either a pedal cycle or motorcycle is disclosed in U.S. Pat. No. 5,011,170. The '170 patent relates to trailers and particular to the trailers that are used with bicycles and motorcycles. The trailer may be moved 90 degrees relative to the bike when moving or parked. Locking it in such a position while parked prevents it from being wheeled away.

A French patent 2 454 951 discloses an attachment for hauling a single wheeled trailer by a bicycle. The part is fixed to the bicycle frame to form a towing attachment. There is an arrangement to allow trailer movement in two planes only. The towing attachment is made of two fork pieces welded together and bolted to the rear wheeled spindle and stayed rigidly by the frame. The other part is formed by two cheeks, joined together by a pivot pin which is held at one end by a spring clip.

French patent 2608-547 discloses a trailer that includes a main longitudinal bar with a rear fork for the wheel. The fork is pivoted to rear end of the bar and has a spring-loaded lever system to control the amount of movement, and a shock absorber. The upper surface of the frame bar is equipped with a plate, a transverse bar and a front bracket to support a plastics container with a lid.

A trailer arrangement for a bicycle is shown in the German patent No. 868 120. These prior art designs do not provide a suitable stable towing combination of motorcycle-trailer, particularly a single rear mounted wheel with a frame that supports the wheel and a swing arm and shock absorber. With the growing popularity of motorcycle touring requiring space for carrying personal articles including, such as, camping equipment and luggage, there is growing demand for a stable towing system. All prior art devices include elements promoting instability of the combination of motorcycle and trailer, during the tow. Among these elements promoting instability are the axes of rotation and location of hitch, relative orientation of load frame and trailer wheel axle, relative location of hitch and trailer load frame, and relative location of hitch and trailer wheel axle.

BRIEF SUMMARY OF THE INVENTION

The present invention provides an improved motorcycle apparatus that enables large loads to be carried on the trailer with a low center of gravity. An improved frame geometry incorporates a specially configured hitch that enhances tow stability and a swing arm with an adjustable shock and, a rear fork that is supported by the swing arm to carry a single wheel behind the frame.

The hitch and trailer frame is positioned well below a horizontal line that intersects the axle of the rear wheel of the motorcycle, and preferably also below the axle of the trailer wheel.

The motorcycle trailer apparatus of the present invention thus includes an elongated frame having first and second end portions, the first end portion having a detachable hitch attachment for removably attaching the frame to the rear end portion of the motorcycle.

The swing arm assembly pivotally attaches to the frame at the second end portion of the frame. A single wheel is carried by the swing arm assembly which includes a wheel fork that extends behind the frame.

An adjustable shock absorber extends between the frame and the swing arm assembly. The arm has an upstanding portion that extends above the frame. The shock absorber is inclined, with a rear end portion of the shock absorber being higher than the front end portion of the shock absorber due to its attachment to the inclined portion of the swing arm assembly. This shock and shock mounting arrangement presents the adjustment portion of the shock at an elevated exposed position, enabling easy access.

The hitch attachment includes a gimble arrangement that enables the first end portion of the frame to articulate relative to the motgrcycle during use about two orthogonal axes, i.e., the vertical axis and the horizontal axis perpendicular to the tow line.

The frame can include left and right horizontal members with the wheel positioned in between the left and right horizontal members 47 and thus hitch member and is supported at the hitch and railer wheel axle relatively below the axles of the rear wheel of the motorcycle and the trailer wheel.

The shock absorber can be a single shock absorber that is positioned on a transverse strut that extends between the left and right horizontal members.

The frame provides a pivot at its rear or second end portion. The swing arm assembly pivotally attaches to the frame at the pivot. The swing arm includes a trailing fork portion that extends behind the pivot and carries the wheel.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is an elevational view of the preferred embodiment of the apparatus of the present invention;

FIG. 2 is a top plan view of the preferred embodiment of the apparatus of the present invention;

FIG. 3 is an elevational view of the preferred embodiment of the apparatus of the present invention;

FIG. 4 is a sectional elevational view of the preferred embodiment of the apparatus of the present invention, taken along lines 4—4 of FIG. 2;

DETAILED DESCRIPTION OF THE INVENTION

Figure 7:
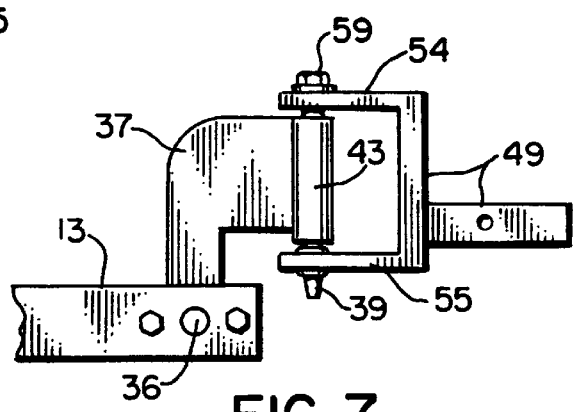

FIGS. 1, 2 and 7 show the preferred embodiment of the apparatus of the present invention designated generally by the numeral 10 in FIGS. 1, 2 and 7. Motorcycle trailer apparatus 10 provides an elongated frame 11 that can be manufactured of welded metallic tubing such as steel, aluminum, or titanium. The frame 11 can also be constructed of composite or carbon fiber materials. Frame 11 includes a left side frame member 12 and right side frame member 12. The frame 11 has a front end portion 14 and a rear end portion 15. Transverse members 16, 17, 18 span between the left and right side frame members 12, 13. Container 46 of fiberglass, for example, can be mounted on frame 11 (see FIG. 3).

A single rear wheel 19 is mounted behind the rear end portion 15 of frame 11 upon swing arm assembly 20. The swing arm assembly 20 is mounted to frame 11 using a pair of spaced apart bearings 21, 22 as shown in FIG. 2, such as pillow block bearings, for example. A pivot member 23 forms a pivotal attachment between the swing arm assembly 20 and frame 11.

Swing arm assembly includes a pair of fork members 24, 25 mounted to pivot member 23 as shown in FIGS. 1 and 2. Wheel 19 is mounted at wheel axle 26 and hub 27 to fork members 24 and 25 as shown in FIGS. 1 and 2.

A shock absorber 28 extends from frame 11 to swing arm assembly 20. The shock absorber 28 is inclined as shown in FIG. 1, having a forward attachment at bolted connection 30 to bracket 29. The bracket 29 can be an ell-shaped bracket that is welded to transverse member 18. The opposite or rear end portion of shock absorber 28 is at a higher elevational position than the bolted connection 30 securing front end portion of shock 28 to transverse member 18. A bolted connection 32 secures this elevated portion of shock 28 to swing arm assembly 20 at inclined pivoting shock support 31.

The fork members 24, 25 and inclined pivoting shock support 31 are connected (e.g. welded) to pivot member 23 so that they define the swing arm assembly 20 as a unit. Swing arm assembly 20 rotates with respect to frame 11 during use (see arrow 44 in FIG. 1). This rotation is allowed by compression and extension of shock member 28 during use as wheel 19 encounters bumps or depressions in the road surface. Wheel 19 rotates relative to frame 11 by rotating about pivot 23 as indicated by arrows 45 in FIG. 1. A significant aspect of the present invention, contributing materially to the stability of the motorcycle-trailer combination is the relative positioning of frame 11 in respect to axle 26. By suspending frame 11 by swing arm assembly 20 and pivot member 23 below axle 26, the center of gravity of the trailer 10 is below the trailer wheel center (i.e., axle 26). Accordingly, the center of gravity of the trailer 10 and likely any load (not shown) in the trailer 10, will be at or below the pull line of the tow, i.e., between the trailer wheel 19 and the motorcycle rear wheel 80.

In FIGS. 2, 4, 5–7, hitch attachment 33 is provided for joining the trailer frame 11 to motorcycle 40. Hitch attachment 33 includes a pair of bearings 34, 35 such as pillow block bearings at thefront end portion 14 of frame 11. Bearings 34, 35 rotatably support transverse pin 36. An ell-shaped plate 37 is welded at 38 to transverse pin 36 and rotates with it relative to frame 11 upon of bearings 34, 35. With the orientation of bearings 34, 35 providing rotation about transverse pin 36 about an axis horizontal to the ground and perpendicular to the tow line of the trailer, rotation is available to trailer 10 in the vertical directions. It should be appreciated by those skilled in the art that the form of ell-shaped plate is selected as a matter of convenience for the style of motorcycle and trailer combination: Plate 37 may preferably be of different configuration being dictated by relative location (in respect of the centerline of trailer frame 11) and motorcycle rear wheel 80. Likewise, a feature of the present invention is the orientation of hitch attachment 33 below a horizontal line through trailer wheel axle 26.

Cylindrical pin section 43 is connected (e.g. welded) to ell-shaped plate 37. A tapered pin 39 depends from cylindrical section 43 for engaging receptacle 41 when the hitch attachment 33 is connected to the motorcycle for towing.

Figure 5:
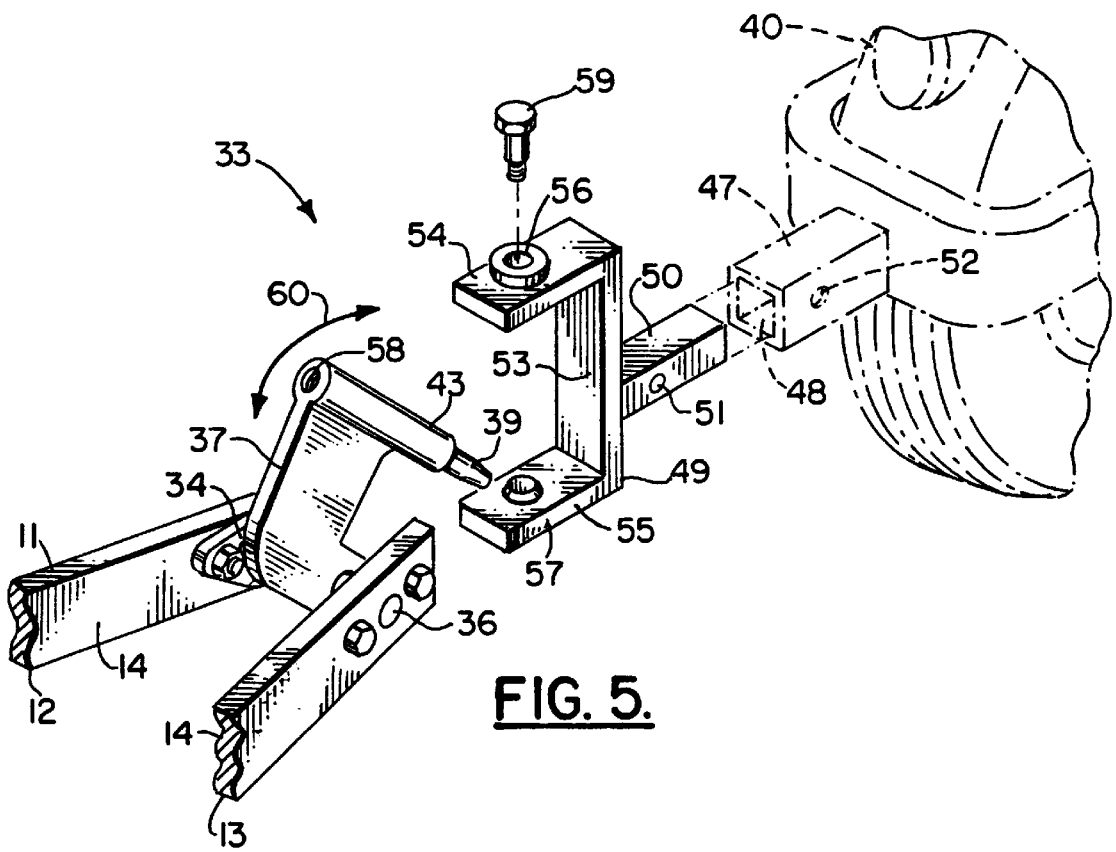
FIG. 5 is a fragmentary perspective view of the hitch attachment portion of the preferred embodiment of the apparatus of the present invention.
Figure 6:
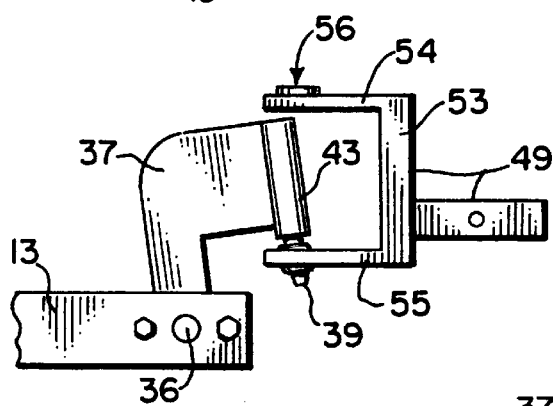
FIGS. 6 and 7 are fragmentary elevational views of the hitch attachment portion of the preferred embodiment of the apparatus of the present invention.

In FIGS. 5–7, the motorcycle 40 can be provided with receiver 47 having a rectangular or square socket 48. Hitch member 49 includes a horizontal tubing section 50 that supports a vertical plate 53 that is welded or otherwise connected to horizontal tubing section 50. Receiver 47 is disposed on motorcycle 40 by means of bracket 40', being fixedly attached thereto whereby receiver 47 is disposed horizontally below motorcycle rear wheel axle 82. As with the relative horizontal location of frame 11 vis-a-vis trailer wheel axle 26, the requisite towing stability of the motorcycletrailer combination is achieved by positioning receiver 47 and thus hitch member 49, when in combination therewith, such that when the trailer is hitched to the motorcycle, frame 11 is horizontally disposed and hitched to motorcycle at or below the pull line formed between motorcycle rear wheel axle 82 and trailer wheel axle 26. In preferred embodiments of the invention ell-shaped member 37 is sized and located on motorcycle 40 (i.e., bracket 40' is located on motorcycle 40) such that transverse pin 36 is positioned from about 4 inches below the axis of rotation of the rear wheel of motorcycle to as much as about 13 inches below the wheel. The limiting factor on the lower dimension is the amount of ground clearance available below the transverse pin 36, and the upper limit is an empirical one in that the lower the transverse pin 36, the better is the stability in tow.

A transverse opening 51 through horizontal tubing section 50 is aligned with a correspondingly shaped horizontal opening 52 through receiver 47 so that when the hitch member 49 is inserted into receiver 47, a transverse locking pin (not shown) can be placed through the openings 51, 52 in order to lock the hitch member 49 to the receiver 47.

Vertical plate 53 supports an upper horizontal plate 54 and a lower horizontal plate 55. Each of the plates 54, 55 provides an opening 56, 57 respectively. In order to connect hitch 33 to receiver 49 and motorcycle 40, the hitch member 49 is pinned to the receiver 47 as afore described.

The hitch member 33 attaches to hitch member 49 at plates 54, 55. Tapered pin 39 fits opening 57 of lower horizontal plate 55. Internally threaded opening 58 at the top of cylindrical section 43 of hitch 33 is aligned with upper opening 56 preferably including bushing 56', of upper plate 54 as shown in FIGS. 6 and 7. When the openings 56 and 58 are aligned, assembly bolt 59 can be placed through opening 56 and then into threaded engagement with the internally threaded opening 58. The assembled configuration can be seen in FIG. 7. During such an assembly, the tapered pin 39 is first placed in opening 57. Then the cylindrically shaped section 43 is rotated toward motorcycle 40 as shown by arrow 60 in FIG. 5. This aligns the internally threaded opening 58 with opening 56 so that bolt 59 can be inserted through opening 56 and into internally threaded opening 58 to be securely retained therein as shown in FIGS. 6 and 7 however readily rotate in busing 56'. As should be understood by those skilled in the art, bolt 59, or an alternative such as a securable pin may be secured in ell-shaped plate 37 to provide the vertical axis about which plate 37 may rotate in hitch member 49. Threaded opening 58 and bolt 59 (with bushing 56') provide a readily attachable and secure means in combination with tapered pin 39 and transverse pin 36 for forming the vertical axis of hitch attachment 33. The rotation available about the vertical axis of hitch attachment 33 and the rotation available about transverse pin 39 provide good tracking for the trailer in turns and over uneven ground, however offers a secure orientation with the motorcycle in the remaining orthogonal plane. This security plus the relative position of the trailer frame 11 below the axes of the trailer wheel 26 and the rear motorcycle wheel 80 are believed to provide the heretofore unavailable tow stability.

Figure 8:
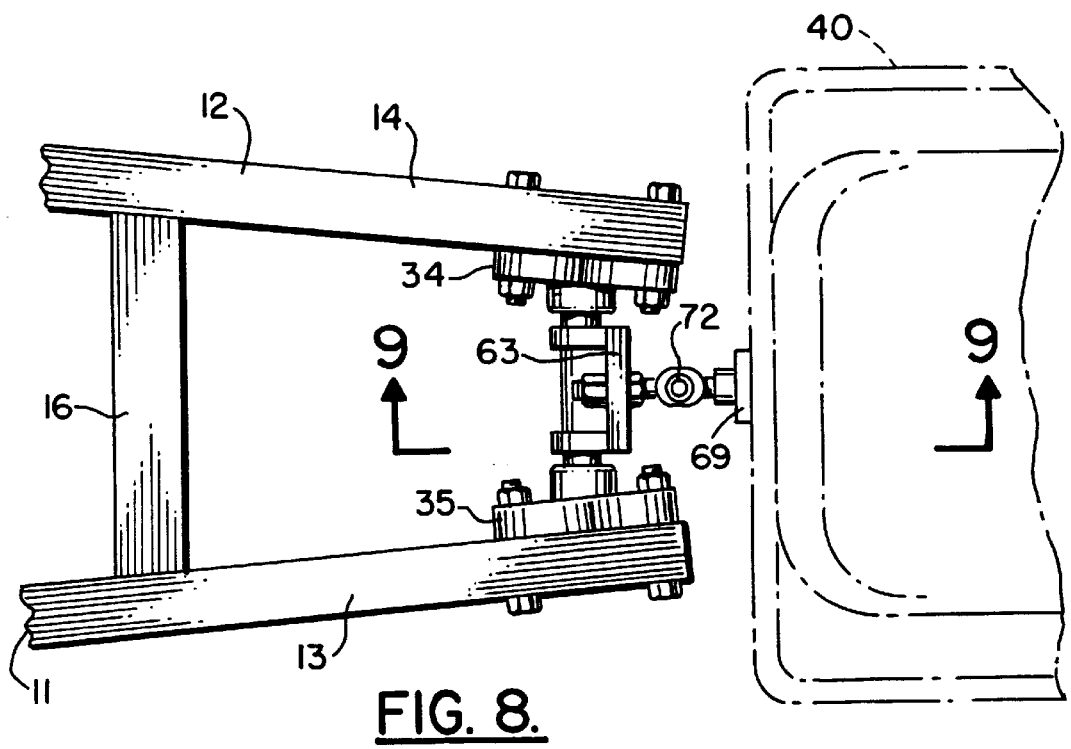
FIG. 8 is a fragmentary plan view of an alternate embodiment.
Figure 9:
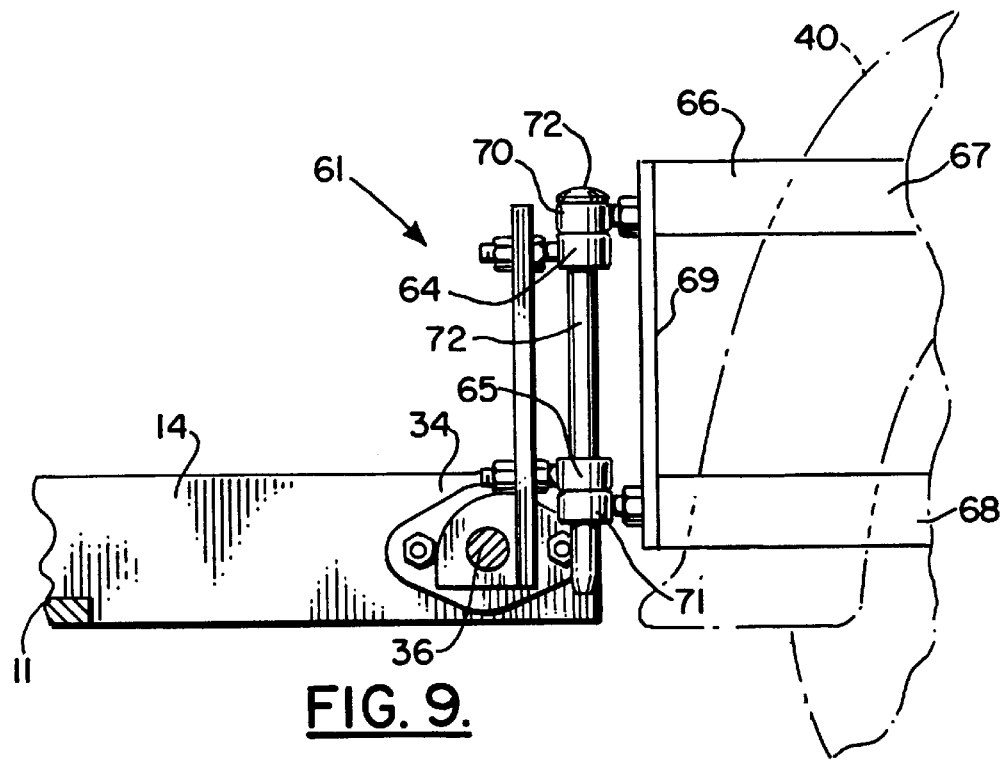
FIG. 9 is an elevational view of an alternate embodiment of the hitch portion of the apparatus of the present invention.

In FIGS. 8 and 9, an alternate construction of the hitch is shown, designated generally by the numeral 61 in FIGS. 8 and 9. In FIGS. 8 and 9, frame 11 is shown including left and right frame sections 12, 13 and transverse member 16. A pair of bearings such as pillow block bearings 34, 35 support hitch member 62. The hitch member 62 includes a vertical plate 63 that carries a pair of spaced apart eyelets 64, 65. Motorcycle 40 carries a receiver 66 that includes upper and lower frame sections 67, 68 respectively and vertical plate 69. Eyelets 70, 71 are mounted upon plate 69. Locking pin 72 completes a connection between trailer frame 11 and motorcycle 40 when the pin 72 passes through eyelets 64, 65 and 70, 71 as shown in FIG. 9.

The following table lists the parts numbers and parts descriptions as used herein and in the drawings attached hereto.

| Part Number | Description |
| --- | --- |
| | PARTS LIST |
| 10 | motorcycle trailer apparatus |
| 11 | frame |
| 12 | left side frame member |
| 13 | right side frame member |
| 14 | front end portion |
| 15 | rear end portion |
| 16 | transverse member |
| 17 | transverse member |
| 18 | transverse member |
| 19 | wheel |
| 20 | swing arm assembly |
| 21 | pillow block bearing |
| 22 | pillow block bearing |
| 23 | pivot member |
| 24 | fork member |
| 25 | fork member |
| 26 | wheel axle |
| 27 | wheel hub |
| 28 | shock absorber |
| 29 | bracket |
| 30 | bolted connection |
| 31 | inclined pivoting shock support |
| 32 | bolted connection |
| 33 | hitch attachment |
| 34 | bearing |
| 35 | bearing |
| 36 | transverse pin |
| 37 | ell-shaped plate |
| 38 | weld |
| 39 | tapered pin |
| 40 | motorcycle |
| 40' | bracket |
| 41 | receptacle |
| 42 | annular shoulder |
| 43 | cylindrical section |
| 44 | arrow |
| 45 | arrow |
| 46 | container |
| 47 | receiver |
| 48 | square socket |
| 49 | hitch member |
| 50 | horizontal tubing section |
| 51 | transverse opening |
| 52 | transverse opening |
| 53 | vertical plate |
| 54 | upper horizontal plate |
| 55 | lower horizontal plate |
| 56 | upper opening |
| 57 | lower opening |
| 58 | internally threaded opening |
| 59 | bolt |
| 60 | arrow |
| 61 | hitch |
| 62 | hitch member |

-continued

PARTS LIST

| Part Number | Description |
| --- | --- |
| 63 | plate |
| 64 | eyelet |
| 65 | eyelet |
| 66 | frame |
| 67 | upper frame section |
| 68 | lower frame section |
| 69 | vertical plate |
| 70 | eyelet |
| 71 | eyelet |
| 72 | pin |
| 80 | motorcycle rear wheel |
| 82 | rear wheel axle |

The foregoing embodiments are presented by way of example only; the scope of the present invention is to be limited only by the following claims.

I claim:

1. A motorcycle trailer apparatus comprising:
   a) an elongated frame having first and second end portions, the first end portion having a detachable hitch attachment for attaching the frame to the rear end portion of a motorcycle;
   b) an arm assembly attached to the frame at a pivot in the second end portion of the frame and the arm comprises a trailing fork portion that extends behind the pivot;
   c) a single wheel carried by the arm assembly wherein the wheel has an axle that is positioned above the pivot during use;
   d) a shock absorber that extends between the frame and the arm assembly, the arm assembly having an inclined portion that extends above the frame; and
   e) the shock absorber being inclined, the rear end portion of the shock absorber being higher than the front end portion of the shock absorber.

2. The motorcycle trailer apparatus of claim 1 wherein the frame includes left and right horizontal members and the wheel is positioned in between the left and right horizontal members.

3. The motorcycle trailer apparatus of claims 2 wherein the shock absorber is positioned in between the left and right horizontal members.

4. The motorcycle trailer apparatus of claim 2 wherein the arm comprises two rearwardly extending member that straddle the wheel and extend behind the frame.

5. The motorcycle trailer apparatus of claim 4 further comprising a pair of opposed pillow blocks mounted respectively on the left and right horizontal members to define said pivotal connection between the arm rearwardly extending members and the frame.

6. The motorcycle trailer apparatus of claim 1 wherein the shock absorber is an adjustable shock absorber.

7. The motorcycle trailer apparatus of claim 1 further comprising a pivoting rear shaft positioned at the rear end portion of the frame, said arm being attached to said rear shaft.

8. A motorcycle trailer apparatus comprising:
   a) an elongated frame having first and second end portions, the first end portion having a detachable hitch attachment for attaching the frame to the rear end portion of a motorcycle;
   b) an arm assembly pivotally attached to the frame at the second end portion of the frame;
   c) a single wheel carried by the arm assembly;
   d) a shock absorber that extends between the frame and the arm assembly, the arm assembly having an inclined portion that extends above the frame; and
   e) the shock absorber being inclined, the rear end portion of the shock absorber being higher than the front end portion of the shock absorber
   f) the hitch attachment includes a generally horizontal shaft that extends transversely across the front end portion of the frame and the hitch attachment includes a pair of pillow blocks that receive respective end portions of the horizontal shaft.

9. A motorcycle trailer apparatus comprising:
   a) an elongated frame having first and second end portions, the first end portion having a detachable hitch attachment for attaching the frame to the rear end portion of a motorcycle;
   b) an arm assembly pivotally attached to the frame at the second end portion of the frame;
   c) a single wheel carried by the arm assembly;
   d) a shock absorber that extends between the frame and the arm assembly, the arm assembly having an inclined portion that extends above the frame; and
   e) the shock absorber being inclined, the rear end portion of the shock absorber being higher than the front end portion of the shock absorber
   f) the hitch attachment includes a generally horizontal shaft that extends transversely across the front end portion of the frame and a portion that extends above and in front of the horizontal shaft and includes a rotational connection having a generally vertical axis.

10. A motorcycle trailer apparatus comprising:
    a) an elongated frame having first and second end portions, the first end portion having a detachable hitch attachment for attaching the frame to the rear end portion of a motorcycle;
    b) a swing arm that extends away from the rear of the frame;
    c) a pivot on the frame pivotally support the swing arm;
    d) the swing arm supporting a single wheel;
    e) a shock absorber that extends between the frame and the swing arm, the swing arm including an inclined portion that extends above the frame and in front of the pivot during use;
    f) the shock absorber being affixed at one of its end portions to the inclined portion of the swing arm and at its other end portion being attached to the framne in front of the pivot; and
    g) the wheel has an axle and the axle is on about the same elevational position as one end portion of the shock absorber.

11. The motorcycle trailer apparatus of claim 10 wherein the frame has left and right side portions and the second end portion of the frame has a shaft that spans between the left and right side portions of the frame, and the swing arm is attached to the shaft inside of the left and right side portions of the frame.

12. A motorcycle trailer apparatus comprising;
    a) an elongated frame having first and second end portions, the first end portion having a detachable hitch attachment for attaching the frame to the rear end portion of a motorcycle;
    b) an arm that extends away from the rear of the frame;
    c) a pivot on the frame pivotally supporting the swing arm;

d) the arm supporting a single wheel with an axis of rotation;

e) a shock absorber that extends between the frame and the arm;

f) the shock absorber being affixed at one end of its end portions to the arm and at its other end portion being attached to the frame; and g) a hitch for attaching the frame to a motorcycle, the hitch being positioned below the axis of rotation of the rear wheel of the motorcycle and the hitch includes a transverse shaft mounted to the frame with rotary bearings.

13. A The motorcycle trailer apparatus of claim 12 wherein the hitch includes a vertically extended portion that has a vertical axis of rotation.

14. The motorcycle trailer apparatus of claim 12 wherein the transverse shaft is between about four and about 13 inches below the motorcycle rear wheel axis of rotation.

15. The motorcycle trailer apparatus of claim 12 wherein the hitch includes a portion on the motorcycle and a portion on the frame and a plurality of eyelets that form part of an attachment between said portions, and a pin that is inserted through said eyelets during towing.

16. The motorcycle trailer apparatus of claim 12 wherein the hitch includes a horizontal shaft portion that is positioned below he axis of rotation of the rear wheel of the motorcycle.

17. The motorcycle trailer apparatus of claim 12 wherein the hitch articulates about a horizontal axis that is positioned below the axis of rotation of the rear wheel of the motorcycle.

18. The motorcycle apparatus of claim 12 wherein the hitch rotates about a first horizontal axis and a second vertical axis that extends above the horizontal axis.

19. The motorcycle trailer apparatus of claim 12 wherein the second vertical axis is positioned at least partially below the axis of rotation of the rear wheel of the motorcycle.

\* \* \* \* \*